Nov. 13, 1928.  L. KIRSCHBRAUN ET AL  1,691,767
PROCESS OF PRODUCING EMULSIONS OR DISPERSIONS
Original Filed Dec. 17, 1925
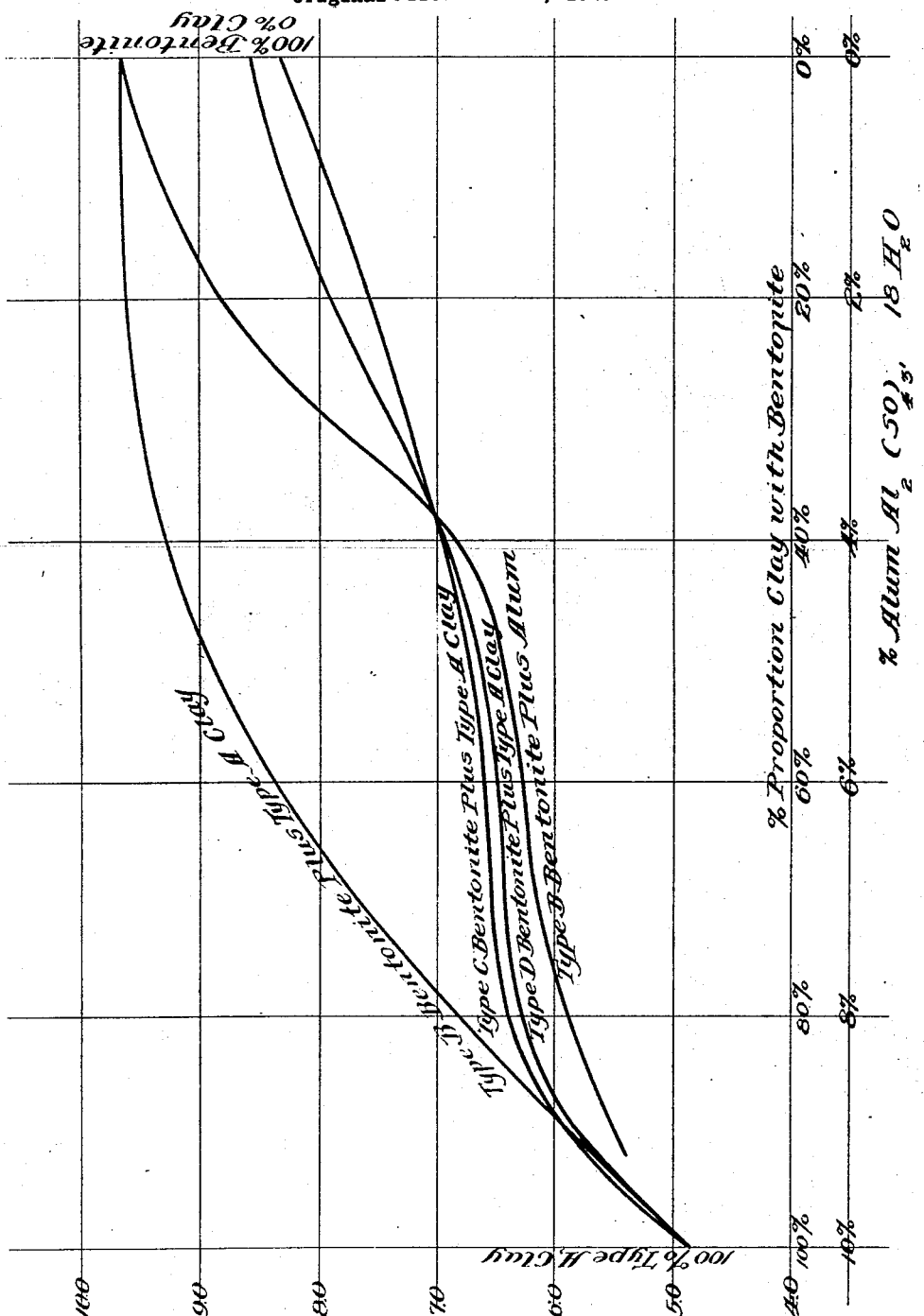

Patented Nov. 13, 1928.

1,691,767

UNITED STATES PATENT OFFICE.

LESTER KIRSCHBRAUN, OF CHICAGO, ILLINOIS, AND HAROLD L. LEVIN, OF PASSAIC, NEW JERSEY, ASSIGNORS TO THE FLINTKOTE COMPANY, OF BOSTON, MASSACHUSETTS, A CORPORATION OF MASSACHUSETTS.

PROCESS OF PRODUCING EMULSIONS OR DISPERSIONS.

Original application filed December 17, 1925, Serial No. 76,012. Divided and this application filed October 12, 1926. Serial No. 141,138.

This application is a division of our application Serial No. 76,012 filed December 17th, 1925.

This invention relates to improvements in process of producing emulsions or dispersions of pitch and/or oleaginous bodies with mineral powders which are insoluble in water but suspendable therein to form a paste or slurry. Such powders comprise clays, bentonites, argillaceous minerals, finely divided silicates, metallic oxides and hydroxides, pigments and in general, finely divided mineral products having more or less plasticity and/or viscosity when suspended or mixed with water to a paste or slurry form.

The pitch or oleaginous material dealt with in this connection, includes a wide variety of substances, including bitumens, liquid and solid hydrocarbons, natural and artificial resins, ester gums, stearines, waxes, tempered if desired, with fluxing oils which may be petroleum products, drying or non-drying oils or fatty acids. The more solid of these may be generally said to partake of a pitchy nature and possess in common the property of being immiscible with water and rendered fusible or more limpid with heat. They will constitute in this process, the material undergoing dispersion or the dispersed phase of the product.

Experience in producing emulsions of the kind referred to has developed the fact that certain types of pitches and oleaginous bodies emulsify more readily with particular types of mineral substances of the above character. While usually some quantity of most pitches can be dispersed with many kinds of mineral base, yet the amount of pitch dispersed in many instances is so small as to constitute a minor or insufficient portion of the resulting product. The resulting dispersion in such cases is so highly loaded with mineral matter that the pitchy substance is unable to function as a binder and no utility of commercial importance resides in a product of such character.

In the course of experience in handling and emulsifying pitchy substances and combinations such as referred to, it has been found that a given pitch would emulsify better with, for instance, one type of clay than another; that in certain instances, combinations of clays afford superior emulsive properties; that combinations of bentonites with clays or bentonies with other mineral powders may afford the optimum emulsive properties for a given pitchy base. Or, given a certain colloidal paste-forming emulsifying agent, a change in the character of the pitch often makes it possible to produce rapidly an emulsion or dispersion, whereas the original or unmodified material would disperse with difficulty in small quantities or coarsely, if at all.

As a result of extended study and observations, it has been discovered that one of the most important elements in understanding and controlling the above described behavior, resides in the hydrogen ion concentration of the aqueous suspension or paste of the emulsifying agent. It has been further discovered, that the hydrogen ion concentrations of such suspensions are not only important of themselves, but must be considered in relation to the acidic or basic character of the pitch which is to be emulsified, as well as to the other physical properties of the dispersing agent, such as surface tension, plasticity, degree of fineness, and possibly other factors not yet known.

It will be understood from the nature of the substances referred to above as pitchy, or employed for dispersion, that some of them may be basic and some of them may be of an acidic nature. For example, both rosin and stearine pitch are naturally acidic. A fluxing oil such as oleic acid is acidic. Certain grades of para-cumaron are basic. Asphaltic residues vary from acidic to basic, the lighter or thinner residues such as fuel oil or residuum from Mexican stock being acidic, the acidity diminishing as the material becomes heavier, passing through a neutral range at certain stages and actually becoming basic with the harder varieties of asphalts.

That this latter is true, may be deduced from the fact that using a given clay of say, pH 6.0 as dispersing agent, and dispersing thereby a certain amount of say, 120° F. melting point steam refined Mexican asphalt, the pH value of the resultant dispersion progressively increases with increments of asphalt dispersed, until a point is reached at which either no further asphalt can be dispersed and the emulsion breaks, or the addition of acidic bodies in regulated quantities becomes necessary to enable further dispersion of the asphalt base to take place.

These phenomena become understandable and controllable in the light of the hydrogen ion concentration or pH value of the dispersing agent, and the adjustment of same in relation to the type of pitch undergoing emulsification or dispersion.

It has been found that clays, bentonites and mineral substances of the class referred to, vary greatly as to their pH value when suspended in water, from a noticeable high degree of acidity to a substantial alkalinity. Further, combinations of clays or mineral substances when brought together, result in modified (though not algebraically additive) pH characteristics. Adjustments of pH value for various dispersing materials can be made by a study of the pH value of the individual mineral powders as well as a study of their pH characteristics when brought together in varying proportions. In this way it is possible to prepare a combination of emulsifying minerals of a predetermined pH value by either combining them, or by treating them either alone or in combination, with suitable amounts of either basic or acidic substances.

It will of course, be apparent, that the type of water used as the suspending medium will be of great importance, and must be considered in predetermining the pH value of the final system. Likewise, the character of pitch undergoing dispersion and its effect in modifying the pH value of the system must be taken into account.

In order that the general principle of operation may be thoroughly understood, there is presented a drawing showing as an example, a graphical plot of the pH value of a combination of a number of bentonites with a New Jersey ball clay in varying proportions, pH value being plotted as ordinates and the percentage concentration of each of the constitutent mineral dispersing agents as abscissæ. There is likewise exhibited a plot showing the pH characteristics of one of the Bentonites known as Type B, with modification by aluminum sulphate Al

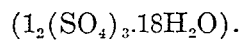
$(1_2(SO_4)_3 \cdot 18H_2O)$.

It will be apparent that a wide range of pH value may be achieved by proper admixture of two types of dispersing media, and that with a given dispersion medium such as say, Type B, which of itself has a pH value of approximately 9.5, practically any suitable modification of this value may be attained by treatment of this particular type of dispersing media with alum or other acidic reagent.

It has been found by practical determination, that an asphaltic material such as 120° F. melting point steam refined Mexican asphalt, will emulsify quite satisfactorily with a mixture of about one-half Type C or D with one-half Type A clay. If Type B is used in place of the Type C, the emulsive properties of the mixture become decidedly diminished so that relatively little asphalt may be dispersed. If it be attempted to employ the Type B or the Type C alone, the same result follows. The optimum pH value or range for dispersion of this particular kind of pitch is apparently around 6.0–6.5, and by modifying the pH of the Type B in any suitable way to achieve this pH, satisfactory dispersion will then result where no substantial dispersion could be obtained. Thus, by successive attempts to emulsify with emulsifying media of widely divergent pH values, or, if either of these extreme values be unsuccessful, further attempts be made to emulsify with materials having pH values intermediate these divergent values, the range is thus continuously narrowed until the optimum point of emulsification is found and the pH value at this point is thereby disclosed. This same procedure followed for any other type of material will disclose the optimum pH value or range at which it will efficiently disperse large quantities of that material.

While dispersion takes place with this particular pitch under the condition cited, that is, where the aqueous suspension of the dispersion means has a pH of 6.5 (with the particular water used) nevertheless, a limit of the amount of asphalt to be dispersed is reached when approximately fifteen times as much asphalt has been dispersed in relation to the clay. If then the pH value of the system be determined, it will be found that the pH value has increased substantially. If the system be treated with an acidic salt or with an acid in regulated quantities so as to reduce the pH of the system, further quantities of asphalt can then be dispersed.

Under commercial conditions the dispersion is carried out in a continuous emulsifier, so that the pH of the final system may be anticipated by adjusting the pH of the aqueous suspension of the emulsifying agent in relation to the effect upon the pH of the pitch undergoing dispersion. This may be done by either treating the dispersion means as described, or introducing the desired amount of reagent into the emulsifying mill, or by introducing a buffer salt which will hold the pH value or hydrogen ion concentration to within substantially predetermined constant limits.

In the previous example given, Mexican asphalt of about 120° F. melting point dispersed under the conditions referred to satisfactorily at a pH of between 6.0 to 6.5. As a matter of practical experience in operating a continuous process, even inside this range, a preferable condition is found at pH 6.3. If a somewhat harder asphalt is used of the same general origin, the best pH conditions are found at from 6.1 to 6.2. On the other hand where a pitch of entirely different character is employed, such for instance, as stearine pitch prepared from vegetable oils, an optimum emulsive condition exists at around pH 8.0. It is to be understood of course, that we do not in any way wish to limit ourselves to these examples or figures as they are merely illustrative of an optimum condition.

It will thus be seen that by adjusting the pH value or range of the aqueous dispersion means or components of the system, the peculiarities of behavior of various emulsifying powders and pitches may be controlled so that practically any emulsifying mineral in finely divided form can be treated to emulsify practically any pitch.

Having determined for a given pitch, satisfactory emulsive conditions, thereafter other dispersion means should be adjusted to the same pH conditions thus determined.

From the foregoing description it is to be understood that the invention contemplates the adjustment of the hydrogen ion concentration of the aqueous dispersion media to a pre-determined pH value; the maintaining of the hydrogen ion concentration of the aqueous dispersion media within the pre-determined pH value range which permits the desired dispersion; and the maintaining of the hydrogen ion concentration of the system while undergoing dispersion within the pre-determined pH value range which will accomplish this purpose.

By the term "pitchy" as used in the claims, it is understood that we include the wide variety of substances set forth in one of the introductory paragraphs of this specification.

It is understood that the term "value" as used in the claims, is to be defined in a broad sense and includes a range of values.

The term "electrolyte" as used in the claims, is intended to include any acid or acidic salt or any base or basic salt employed thereas, or any similar substance capable of ionizing in solution to affect the pH value thereof, and does not include emulsifying agents or colloids which function as emulsifying agents, and which affect hydrogen ion concentration.

We claim as our invention:

1. In the process of producing a dispersion of a pitch-like substance in an aqueous vehicle, the step of maintaining the hydrogen ion concentration of the aqueous dispersion means at a predetermined pH value.

2. In the process of producing a dispersion of a pitchy substance in an aqueous vehicle, the step which includes the addition of a buffer salt to hold the hydrogen ion concentration of the system to within substantially pre-determined constant limits.

3. In the process of producing a dispersion of a pitchy substance in an aqueous vehicle, the step which includes the addition of an agent to adjust and hold the hydrogen ion concentration of the system to within substantially predetermined constant limits.

4. In a process of producing a dispersion of a pitch-like material in an aqueous vehicle, the steps which comprise adjusting the hydrogen ion concentration of the aqueous dispersion means and maintaining the system at a predetermined pH value while dispersion is effected.

5. In the process of producing a dispersion of a pitchy substance in an aqueous vehicle containing insoluble dispersive media, the step which includes the addition of a buffer salt to hold the hydrogen ion concentration of the system to within pre-determined constant limits.

6. In the process of producing a dispersion of a pitchy substance in an aqueous vehicle containing insoluble mineral powders, the step which includes the addition of a buffer salt to hold the hydrogen ion concentration of the system to within pre-determined constant limits.

7. In the process of producing a dispersion of a pitchy substance in an aqueous vehicle, the step which includes the addition of an agent to control and maintain a predetermined ion concentration on the system while undergoing dispersion.

8. In the process of producing a dispersion of a pitchy substance in an aqueous vehicle containing an insoluble mineral powder, the step which includes the addition of an agent to control and maintain a predetermined hydrogen ion concentration on the system while undergoing dispersion.

9. In a process of producing a dispersion in an aqueous vehicle of a water repellent base normally immiscible with water, the step which comprises adjusting the hydrogen ion concenration of the system undergoing dispersion to a pre-determined pH value.

10. In the process of producing a dispersion of a pitchy substance in an aqueous vehicle, the step of adjusting the hydrogen ion concentration of the aqueous dispersion means to a predetermined value by combining an electrolyte with said dispersion means.

11. In the process of producing aqueous bitumen-pitch type dispersions, the steps comprising adjusting the hydrogen ion concentration of an aqueous suspension of dispersive media, by combining an electrolyte with said suspension, dispersing pitch with said adjusted suspension, and keeping the mass undergoing dispersion within a relatively narrow range of pH value by the addition of a buffer salt thereto.

12. In the production of aqueous pitch-type dispersions, the steps which comprise making an aqueous suspension of a mineral powder dispersing agent, treating the said suspension with an electrolyte to adjust the hydrogen ion concentration of said suspension to a predetermined pH value, and effecting dispersion of pitch with said adjusted suspension.

13. In the production of aqueous bitumen-pitch type dispersions, the steps which comprise making an aqueous suspension of a clay-like dispersing agent, treating the said suspension with an electrolyte to adjust the hydrogen ion concentration of said suspension to a predetermined pH value, and effecting dispersion of pitch with said adjusted suspension.

14. In the production of aqueous bitumen-pitch type dispersions, the steps which comprise making an aqueous suspension of a plurality of dispersing agents, treating the said suspension with an electrolyte to adjust the hydrogen ion concentration of said suspension to a predetermined pH value, and effecting dispersion of pitch with said adjusted suspension.

15. In the production of aqueous dispersions of pitches with dispersive media comprising bentonite, the steps which comprise adding an acidic substance to an aqueous suspension of bentonite in regulated quantities to adjust the hydrogen ion concentration of the bentonite suspension to a predetermined pH value, and dispersing pitch with the adjusted bentonite suspension.

16. Steps in the production of an aqueous dispersion of pitch which comprise making an aqueous paste of a dispersing agent, adjusting the hydrogen ion concentration of said paste to a predetermined pH value, dispersing pitch with said adjusted suspension, continuing the dispersing action until no further substantial quantities of pitch can be dispersed, adjusting the hydrogen ion concentration of the system whereby to cause the same to permit further dispersion of pitch to be effected therein, and dispersing further quantities of pitch therein.

LESTER KIRSCHBRAUN.
HAROLD L. LEVIN.

CERTIFICATE OF CORRECTION.

Patent No. 1,691,767.  Granted November 13, 1928, to

LESTER KIRSCHBRAUN and HAROLD L. LEVIN.

It is hereby certified that the above numbered patent was erroneously issued to "The Flintkote Company", as assignee of the entire interest in said invention, whereas said patent should have been issued to the inventors, said "Kirschbraun and Levin said Levin assignor to The Flintkote Company, of Boston, Massachusetts, a corporation of Massachusetts", as shown by the records of assignments in this office; and that the said Letters Patent should be read with this correction therein that the same may conform to the record of the case in the Patent Office.

Signed and sealed this 8th day of January, A. D. 1929.

(Seal)

M. J. Moore,
Acting Commissioner of Patents.